United States Patent [19]  [11] 3,918,507
Mitchell [45] Nov. 11, 1975

[54] TIRE AND WHEEL ASSEMBLY
[75] Inventor: William E. Mitchell, Coventry, England
[73] Assignee: Dunlop Limited, London, England
[22] Filed: Apr. 2, 1974
[21] Appl. No.: 457,249

Related U.S. Application Data
[60] Division of Ser. No. 271,148, July 12, 1972, Pat. No. 3,818,565, which is a continuation-in-part of Ser. No. 123,513, March 18, 1971, Pat. No. 3,708,847.

[30] Foreign Application Priority Data
Mar. 21, 1970 United Kingdom............... 13746/70

[52] U.S. Cl............................... 152/379; 29/159.01
[51] Int. Cl.² ........................................... B60C 5/00
[58] Field of Search.................... 152/330, 378–384; 29/159, 159.1, 159.01

[56] References Cited
UNITED STATES PATENTS
3,739,829    6/1973    Powell et al. ....................... 152/330

Primary Examiner—Drayton E. Hoffman
Assistant Examiner—Larry H. Martin
Attorney, Agent, or Firm—Stevens, Davis, Miller & Mosher

[57] ABSTRACT

A method for the manufacture of a pneumatic tire and wheel assembly comprising welding a rim having a circumferential well portion to a wheel body portion at a position on the rim on or adjacent one flank of the well portion. A pneumatic tire is mounted on the rim by a method employing the well portion to enable the tire beads to pass over a rim flange, and subsequently at base the well portion of the rim is subjected to axial compression so as to reduce the axial width of the well portion.

3 Claims, 2 Drawing Figures

TIRE AND WHEEL ASSEMBLY

This application is a division of Application Ser. No. 271,148 of July 12, 1972, that application now being Pat. No. 3,818,565 issued June 25, 1974. Application No. 271,148 is in turn a continuation in part of Ser. No. 123,513 filed Mar. 18, 1971, and now Pat. No. 3,708,847.

The present invention relates to wheels and to pneumatic tire and wheel assemblies in which the body or disc portion of the wheel is welded to the wheel rim adjacent a radially inwardly extending flange or beading which is formed by axial compression of a well in the wheel rim.

One object of the present invention is to provide a method for the manufacture of a wheel incorporating a rim having a pneumatic tire permanently mounted thereon, the rim having in cross-section a substantially flat or well-less base portion.

According to one aspect of the invention a method for the manufacture of a pneumatic tire and wheel assembly comprises welding a rim having a circumferential well portion to a wheel body portion at a position on the rim on or adjacent one flank of the well portion, mounting a pneumatic tire on the rim by a method employing the well portion to enable the tire beads to pass over a rim flange, and subsequently subjecting at least the well portion of the rim to axial compression so as to reduce the axial compression so as to reduce the axial width of the well portion.

The radially outer part of the wheel body may be fitted adjacent the inboard flank of the well portion (the term "inboard" having reference to the orientation of the wheel as fitted in its normal position on a vehicle). In this case the rim may conveniently be welded to an axially turned flange of the body portion by a series of spot welds formed in the base of the rim, in a position adjacent the central region of the rim considered in its finished state.

In an alternative method, the radially outer part of the body portion may be located adjacent the outboard flank of the well portion, and in order to avoid distortion of the adjacent bead seating region of the rim by the subsequent welding operation, the spot welds may be made through the adjacent flank of the well portion.

The invention also provides a wheel and pneumatic tire assembly manufactured by a method as defined above.

Two embodiment of the invention will now be described, by way of example with reference to the accompanying drawings in which.

Figure 1:
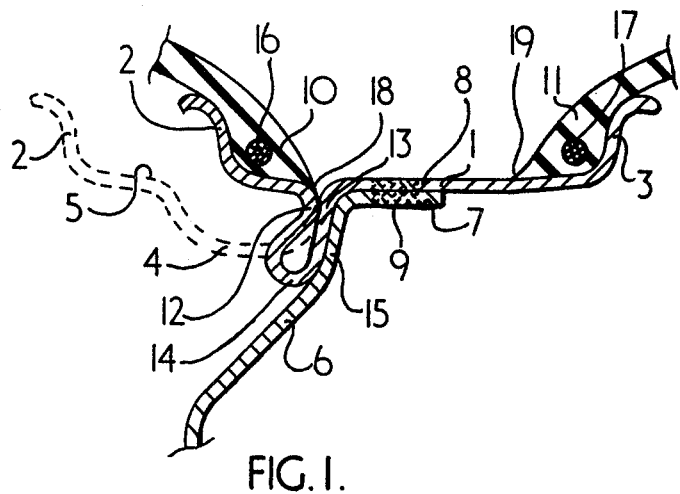
FIG. 1 is a cross-sectional view of a wheel constituting a first embodiment of the invention in two stages of manufacture.

In a preferred embodiment, shown in FIG. 1 a wheel rim 1 is formed with a pair of tire bead retaining flanges 2 and 3 of conventional form and is of cylindrical or flat-base profile apart from a circumferential well portion 4 (shown dotted) which is formed at one side of the rim center line and which is of generally semi-circular profile, terminating at its outboard side adjacent the toe of the bead-seating portion 5.

A wheel body portion 6 formed from sheet metal and of generally conventional profile is formed in its radially outer region with an axially turned flange 7 which is fitted tightly within the flat base portion 8 of the wheel rim 1 and which incorporates a generally frusto-conical outer portion to about the inboard flank of the well in the final state of the rim as shown in full lines. The rim 1 and the body portion 6 are then permanently secured together by a series of 8 evenly-spaced spot welds 9 positioned around the central region of the rim base.

After the wheel rim 1 has been secured to the wheel body portion, 5, a pneumatic tire is fitted to the rim in the conventional manner. using the well portion 4 to enable the tire beads 10 and 11 to be passed over the outboard rim flange 8. The wheel and tire assembly is then placed in a press (not shown) between two dies which fit within the bead seating portions 5 of the rim and engage the flanks of the well portion 4. The dies are formed so that when closed together they compress the radially outer portions 12 and 13 of the flanks of the well 4 into contact with one another, the radially inner portion 14 of the well thus being formed into a bead of approximately circular cross-section, the inboard flank 13 of the well portion being flattened against the frusto-conical outer portion 15 of the wheel body. The tire beads 10 and 11 are provided with circumferentially extending reinforcement wires 16 and 17 and circumferentially extending lip portions 18 and 19 forming extensions to the toes of the beads. The lip portion 18 is arranged to be wedged between the radially outer portions 12 and 13 of the flanks of the well 4.

In moving the dies together as described above the well portion 4 of the rim axially compressed and virtually disappears, the bead seating portions simultaneously being moved towards one another so that after the pressing operation the rim 1 will be of narrow width and of generally flat-based profile as shown in full lines in FIG. 1.

Access for an inflation valve (not shown) located in the flat base portion of the rim is provided through an opening in the wheel body portion, the valve preferably having an L-shaped stem which projects through the opening.

The rim and tire assembly produced by the method described above has a number of particularly advantageous features: it can be manufactured and sold as a unit at a relatively low cost, and is intended to be replace as a unit, eliminating the necessity when changing tires of carrying out the operations of de-mounting and mounting, a tire on the rim. An advantage in terms of vehicle design is that the rim is flat-based, and the absence of the normal well portion thus enables a relatively larger brake to be accommodated within the confines of the rim.

A further advantage of the method described above is that by the use of accurately machined dies which engage the radially inner surface of the bead-seating portions of the wheel rim as well as the flanks of the well portion it is possible to "true" the rim simultaneously with the axial compression of the rim, thus reducing any eccentricity which may have arisen during the previous rim-forming operations.

The provision of a flat based profile in the finished rim has the advantage that axial displacement of the tire beads under cornering forces is more effectively resisted. This reduces the rate of loss of air between the rim and tire which may occur in the event of a puncture with a well-based rim, due to axial displacement of the tire beads. The resistance offered to axial displacement of the tire beads also substantially assists the tire to run true when in the deflated condition.

Figure 2:
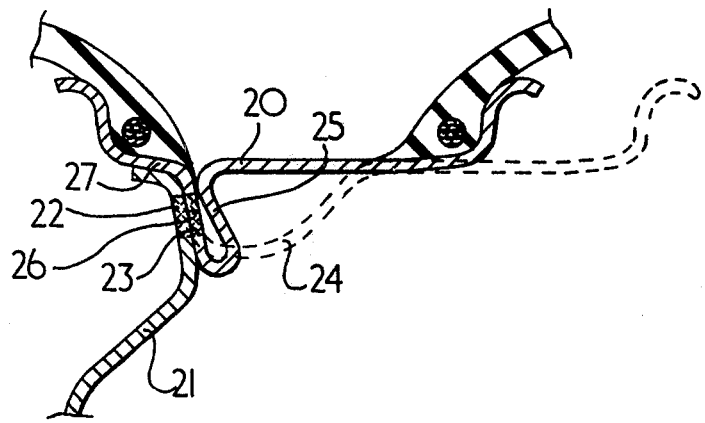
FIG. 2 is a cross-sectional view of a wheel rim showing a wheel constituting a second embodiment of the invention in two stages of manufacture.

In a second embodiment of the invention, shown in FIG. 2, the rim 20 and tire assembly is produced in a broadly similar manner to that described with reference to the first embodiment described above, except that the radially outer part 22 of the body portion 21 is located against the outboard flank 23 of the well 24 instead of the inboard flank 25. In assembling the rim 20 to the body portion 21, spot welds 26 are provided in the outboard flank 23 of the well 24 to secure the rim 20 to the body portion 21, and the radially outer edge 22 of the body portion 21 is turned axially outwardly to lie within the outboard bead-seating portion 27 of the wheel rim 20.

Subsequently the tire is mounted and the rim portion 20 is subjected to axial compression as in the first embodiment described, and the well portion 24 is reduced to a bead lying adjacent the inboard side of the outer part of the wheel body portion 21.

Having now described my invention — what I claim is:

1. A pneumatic tire and wheel assembly comprising a rim having a substantially flat base portion, bead seat portions on opposite sides of the base portion, on which bead seat portions the beads of the tire are respectively located, and rim flanges on the sides of the tire beads and bead seat portions remote from the base portion, the rim having, in its base portions adjacent one of said bead seat portions, a circumferential, radially inwardly extending beading formed by the axial compression of a former well portion, the assembly further comprising a wheel body portion having a radially outer part adjacent one flank of the beading, said body portion being welded to the rim at a position adjacent said flank of the beading.

2. A pneumatic tire and wheel assembly according to claim 1 wherein the radially outer portions of the flanks of the beading are contiguous with one another and the radially inner portion of the beading is of approximately circular cross-section.

3. A pneumatic tire and wheel assembly according to claim 1 wherein the tire beads are provided with circumferentially extending lip portions forming extensions to the toes of the beads.

* * * * *